United States Patent
Bou-Ghannam et al.

(10) Patent No.: US 10,970,347 B2
(45) Date of Patent: Apr. 6, 2021

(54) MANAGING USER ACTIVITY CONTEXT USING AN ACTIVITY CONTEXT GRAPH

(71) Applicant: International Business Machines Corporation, Armonk, NY (US)

(72) Inventors: Akram Bou-Ghannam, Lake Worth, FL (US); Garfield Vaughn, South Windsor, CT (US); Yahia Chemlal, Brno (CZ); Moncef Benboubakeur, Brno (CZ)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 16/247,906

(22) Filed: Jan. 15, 2019

(65) Prior Publication Data

US 2020/0226189 A1 Jul. 16, 2020

(51) Int. Cl.
*G06F 16/00* (2019.01)
*G06F 16/9535* (2019.01)
*H04L 29/08* (2006.01)

(52) U.S. Cl.
CPC .......... *G06F 16/9535* (2019.01); *H04L 67/22* (2013.01); *H04L 67/306* (2013.01)

(58) Field of Classification Search
CPC .............. G06F 16/953; G06F 16/9535; G06F 9/44505; G06F 11/34; G06F 16/639; G06F 17/30772; G06F 17/30867; G06F 17/30011; G06F 17/30864; G06F 17/30899; G06F 12/00; H04L 43/00; H04L 67/22; H04L 67/26; H04L 67/306; G06Q 30/00; G11B 27/031; G11B 27/102; G11B 27/17; G11B 2220/61; G11B 27/13; G11B 15/005; G11B 5/54; G11B 21/022; G11B 7/085; G11B 17/005; G11B 20/10; G10K 15/04; G10L 19/00

See application file for complete search history.

(56) References Cited

U.S. PATENT DOCUMENTS

| | | | |
|---|---|---|---|
| 5,706,501 A * | 1/1998 | Horikiri | H04L 29/12594 709/226 |
| 7,836,002 B2 * | 11/2010 | Macbeth | G10L 15/1822 706/46 |
| 8,612,463 B2 | 12/2013 | Brdiczka et al. | |
| 9,529,916 B1 | 12/2016 | Barguno | |
| 9,594,845 B2 | 3/2017 | Bengualid et al. | |
| 9,697,290 B2 | 7/2017 | Hahn et al. | |
| 2007/0299949 A1 * | 12/2007 | Macbeth | G10L 15/1822 709/223 |

(Continued)

*Primary Examiner* — Anh Ly
(74) *Attorney, Agent, or Firm* — Schmeiser, Olsen & Watts, LLP; William Hartwell

(57) ABSTRACT

A system and method for managing user activity context includes monitoring a user's actions on an electronic device; analyzing a resource accessed by the user; identifying an activity being performed by the user based on the analysis of the resource; and generating an activity context graph for the identified activity, wherein the activity context graph includes information regarding the resource. The activity context graph may be updated with additional resources accessed by the user if the additional resources are associated with the identified activity. The activity context graph may be provided to another user and may be updated to reflect the other user's profile, settings, or other information.

20 Claims, 9 Drawing Sheets

(56) References Cited

U.S. PATENT DOCUMENTS

| | | | |
|---|---|---|---|
| 2007/0300174 A1* | 12/2007 | Macbeth | G06Q 10/10 |
| | | | 715/772 |
| 2010/0198752 A1* | 8/2010 | Digon | G06Q 50/06 |
| | | | 705/412 |
| 2013/0006940 A1* | 1/2013 | Garza | G06F 16/284 |
| | | | 707/648 |
| 2014/0298347 A1* | 10/2014 | Aylesworth | G06Q 10/0631 |
| | | | 718/104 |
| 2016/0007209 A1* | 1/2016 | Hohs | H04W 4/50 |
| | | | 455/423 |
| 2017/0301255 A1* | 10/2017 | Lee | G16H 50/20 |
| 2018/0191860 A1* | 7/2018 | Ghafourifar | H04L 67/327 |
| 2018/0227789 A1* | 8/2018 | Kothapalli | H04L 67/30 |
| 2019/0205839 A1* | 7/2019 | Dotan-Cohen | G06Q 10/1093 |

* cited by examiner

MANAGING USER ACTIVITY CONTEXT USING AN ACTIVITY CONTEXT GRAPH

TECHNICAL FIELD

The present invention relates to systems and methods for managing user activity context and generating an activity context graph, and more specifically to embodiments of systems and methods for defining and managing user activity in certain contexts by monitoring and analyzing user actions, associating actions and resources with the activity context, and generating an activity context graph for the context or activity.

BACKGROUND

Users engage in various task-based activities in both their personal and professional lives. These activities may be, for example, researching and writing a paper, preparing a quote or proposal, developing a presentation, learning a language, planning a vacation, planning a wedding, purchasing a home, researching financial information such as retirement or other investing, researching education options such as colleges or school districts, or any other activity in which the user consults a plurality of resources. These activities are largely conducted on electronic/digital devices such as computers, phones, tablets, other smart devices, etc., that allow the user to quickly access and review various resources through the internet and other information sharing means.

SUMMARY

An embodiment of the present invention relates to a method, and associated computer system and computer program product, for managing user activity. A processor of a computing system monitors a first user's actions on an electronic device and analyzes a first resource accessed by the first user. The processor identifies an activity being performed by the first user based on the analysis of the first resource and generates an activity context graph for the identified activity, wherein the activity context graph includes information regarding the first resource.

In a further embodiment, the processor also analyzes a second resource accessed by the first user, associates the second resource with the identified activity, and updates the activity context graph with information regarding the second source.

In a yet further embodiment, the processor monitors a second user's actions on an electronic device, determines whether the second user is similar to the first user, and provides the activity context graph to the second user if the processor determines the second user is similar to the first user.

DETAILED DESCRIPTION

Figure 1:
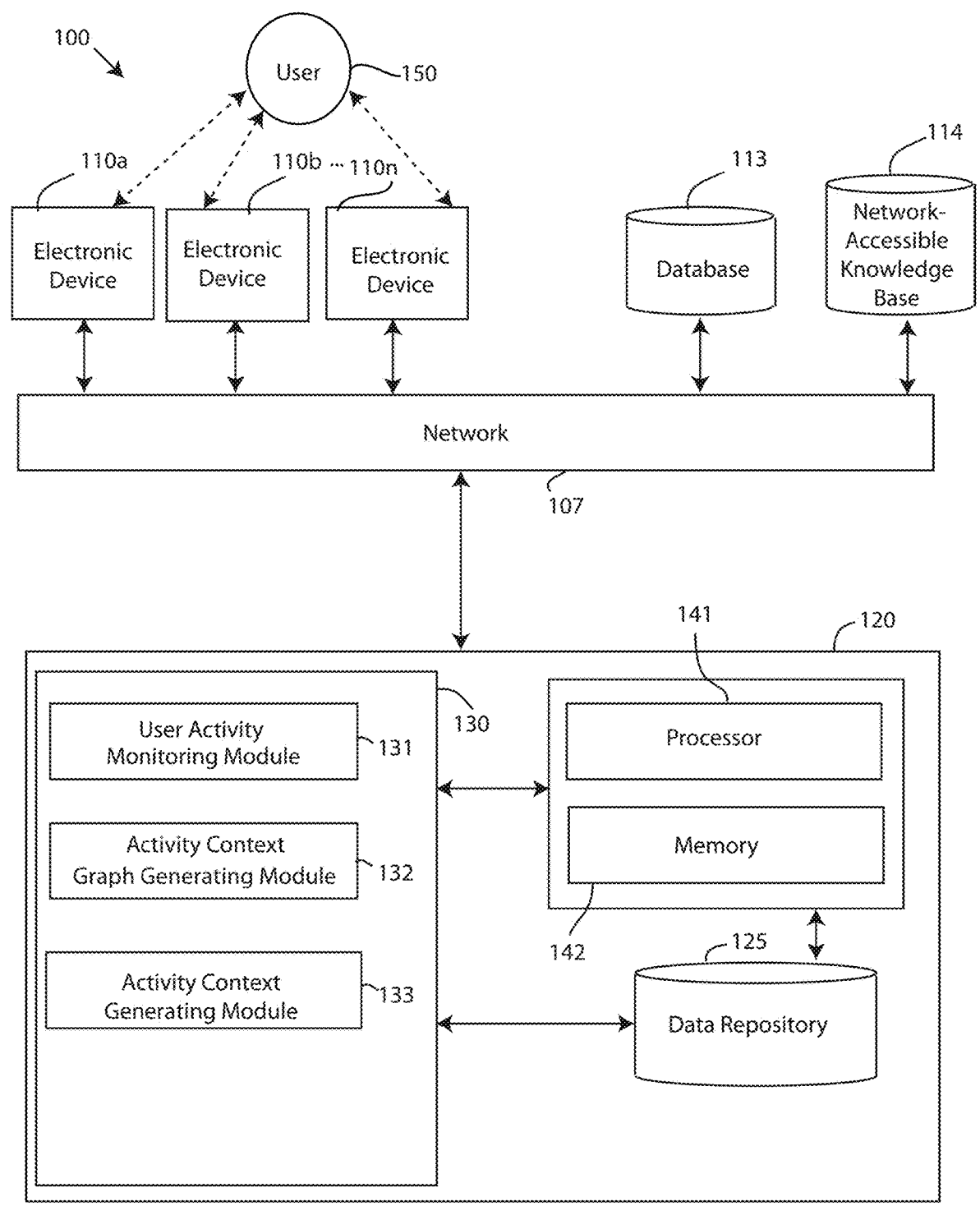
FIG. 1 depicts a block diagram of a user activity context management system 100 in accordance with embodiments of the invention.

Task-based activities such as those discussed above are often long-running, meaning they may take multiple sessions and may be completed over a period of hours, days, weeks, months, or even years. Work on the activities is often interrupted. For example, the user may be redirected to work on a different activity or may simply need to take a break. Further, the user may work on different activities during a single session on the electronic/digital devices or may take actions not related to any activity, such as checking email or social media. Sometimes the user's electronic/digital device may need to be restarted, updated, recharged, or the like. Similarly, the user may use different electronic/digital devices. For example, the user may use a desktop computer or work station while at work but may continue working on the activity at home on a laptop or tablet. Even at work, the user may need to use a different work station, for example, instead of working in the user's office, the user may wish to work from a reference or archive room, a laboratory room, or a conference room. The user may also need to work on the activity while traveling and choose to work on the activity on a smart phone.

The user may also need to access or consult various different resources and may be required to switch between resources at different times. These resources may be saved on the user's electronic/digital devices or may be accessible over a network such as the internet. For example, the user may consult resources such as word processor documents, spreadsheet software documents, slide presentation software presentations, online sources, websites, dynamic content, applications, emails, messages, etc. The term resource may be any type of information accessed or otherwise used on an electronic device by the user. The term access may include creating or editing in some embodiments. For example, when working on a project, the user may often need to consult resources and use that information in other resources, synthesize multiple resources into a new resource, edit resources, etc.

Again, the user may access or consult resources for different activities during sessions or even within the same session or may access or consult resources for other reasons. For example, while working on an activity the user may access social media or email for personal reasons.

Embodiments of the present invention may identify the user's activities or the projects the user is working on. An identified activity or project may be referred to as an activity context. The present invention may associate resources with the activity context. The resources may be saved and/or catalogued for later use. Further, embodiments of the present invention may create an activity context graph for the activity context, that is, for the activity/project. The activity context graph may show the resources accessed or consulted, information about the resources, relationships between the resources, sub-activities within the activity context, and the like. Further, the activity context graph may include the resources or may provide access to the resources, for example, by providing links, bookmarks, or other features allowing easy access to the resources.

The activity context graph may provide for easy restoration of prior work or research pertaining to the activity context. The activity context graph may also be shareable with another user to facilitate an exchange of responsibility for the activity, to assist in collaboration on the activity context, or for application to a similar activity/project.

Referring now to the drawings, FIG. 1 depicts a block diagram of a user activity context management system 100 in accordance with embodiments of the invention. Embodiments of the user activity context management system 100 may be described as a system for defining and managing a user activity context by monitoring resources accessed or used by the user during the activity context. In further embodiments, the user activity context management system 100 may generate a user activity context graph to graphically or visually represent the resources accessed or used by the user during the activity context and provide additional information regarding the resources. The user activity context management system 100 may also store copies of the resources or may otherwise provide access to the resources.

An embodiment of the user activity context management system 100 may comprise a number of electronic devices 110a, 110b . . . 110n communicatively coupled to a computing device 120 over a communication network 107. The electronic devices 110a, 110b . . . 110n connecting to the computing device 120 over the network 107 may vary in different embodiments. The electronic devices 110a, 110b . . . 110n may be computers, work stations, smart phones, tablets, or other electronic devices.

The electronic devices 110a, 110b . . . 110n may be used by one or more users, for example user 150. It will be understood that some of the electronic devices 110a, 110b . . . 110n may normally be used only by a single user, while some electronic devices 110a, 110b . . . 110n may normally be used by multiple users. At times herein the electronic devices 110a, 110b . . . 110n may be referred to generally as electronic device 110.

Users such as user 150 may use the electronic devices 110a, 110b . . . 110n to access one or more resources. Resources may generally be described as any means of presenting information to the user 150 on the electronic devices 110a, 110b . . . 110n, any means of accessing information on the electronic devices 110a, 110b . . . 110n, or any type of information the user 150 uses on the electronic devices 110a, 110b . . . 110n. For example, a resource may be a website accessed through a web browser on one or more of the electronic devices 110a, 110b . . . 110n. Similarly, a resource may be an application or program accessed on one or more of the electronic devices 110a, 110b . . . 110n. Still further, a resource may be a file such as a word processor document, an spreadsheet software document, a slideshow presentation, a PDF, and the like. Dynamic content including audio and/or visual content may be included, for example, videos, slideshows, lectures, and the like. Other exemplary resources may be emails or other messages conveying information to or from the user 150.

The communication network 107 may refer to a group of two or more computer systems linked together. Communication network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the communication network 107 may be a peer-to-peer network in some embodiments, wherein in other embodiments, the network 107 may be organized as a client/server architecture.

In some embodiments, the network 107 may further comprise a connection to one or more network-accessible databases 113. The databases 113 may store resources or other information. In an embodiment, one or more of the network-accessible databases 113 may store the activity context graph.

In some embodiments, the network 107 may further comprise a connection to one or more network-accessible knowledge bases 114 such as network repository, which are network repositories containing information or resources, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging information such as resources accessed by the user 150 on one or more of the electronic devices 110a, 110b . . . 110n, or information exchanged between the electronic devices 110a, 110b . . . 110n, the database 112, the computing system 120, or any combinations thereof. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Referring still to FIG. 1, the user 150 may access one or more of the resources while working on a project/activity. A project/activity may generally be described as a task the user wishes to complete. As described above, a project/activity may be, for example, researching and writing a paper, preparing a quote or proposal, developing a presentation, learning a language, planning a vacation, planning a wedding, purchasing a home, researching financial information such as retirement or other investing, researching education options such as colleges or school districts, researching news on a topic, and the like. It will be understood that these and many other projects/activities may be undertaken by the user 150 using one or more of the electronic devices 110a, 110 . . . 110n, and that the projects/activities may be for work, education, or personal reasons.

Embodiments of the computing system 120 of the user activity context management system 100 may be equipped with a memory device 142 which may store various data/information/code, and a processor 141 for implementing the tasks associated with the user activity context management system 100.

In some embodiments, a user activity context identification and management application 130 may be loaded in the memory device 142 of the computing system 120. Embodiments of the user activity context identification and management application 130 may be an interface, an application, a program, a module, or a combination of modules. In an exemplary embodiment, the user activity context identification and management application 130 may be a software application running on one or more back end servers, servicing one or more of the electronic devices 110a, 110b . . . 110n.

The user activity context identification and management application 130 may include a user activity monitoring module 131 and an activity context graph generating module 132. In some embodiments, the user activity context identification and management application 130 of the computing system 120 may also include an activity context generating module 133. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the user activity monitoring module 131 may include one or more components of hardware and/or software program code for monitoring resources accessed by a user 150 on an electronic device 110 of the one or more electronic devices 110a, 110b . . . 110n. For example, the user 150 may use an electronic device 110 for working on an activity, for example by accessing or creating resources.

The user activity context management system 100 may monitor the user's activity on the electronic device 110, for example through the user activity monitoring module 131 of the user activity context identification and management application 130 of the computing system 120. The user activity monitoring module 131 may analyze or parse the resource and content included in the resource, including meta data. Monitoring, analyzing, and/or parsing the resource may include identifying headings, topics, key words, key terms, and other information in the resource. The user activity monitoring module 131 may also monitor the date and time resources are accessed, duration spent using resources, date and time resources are closed, as well as relationships between resources. For example, the user activity monitoring module 131 may determine that a second resource is accessed after a first resource, that the first resource links to the second resource, that resources cite to the same or similar resources, and the like.

Monitoring, analyzing, and/or parsing will be understood to include conducting various analytics of the resource's content. For example, the resource may be converted to a text-only document or other format amenable to analysis. The user activity monitoring module 131 may use natural language analysis and/or may analyze meta data and other information. Coding, scripting, and the like may be analyzed. Dynamic content such as video/audio and other features may also be analyzed, either directly or after being converted to text or another form. Application program interfaces (APIs) may be used, including conversation APIs, text to speech APIs, speech to text APIs, and the like. Artificial intelligence and/or machine learning may also be employed as part of the monitoring, analyzing, and/or parsing of the resources and information contained therein, as may cloud computing.

It will be understood that the user activity context management system 100 may monitor the user's activity on the various electronic devices 110a, 110b . . . 100n, and may thus monitor the user's activity regardless of the electronic device used. Further, the user activity context management system 100 may distinguish between users based on the user's profile and/or other information, and may be capable of monitoring multiple user's activity on various electronic devices 110a, 110b . . . 110n.

Based on the analysis and/or parsing of the resource, the user activity context identification and management application 130 may identify the work being performed by the user 150 or the resource accessed by the user 150 as relating to a specific project/activity and therefore relating to a specific activity context. For example, the user activity context identification and management application 130 may recognize "wedding" as a key term and identify the work being performed as relating to wedding planning. In another example, the user activity context management system 100 and/or the user activity context identification and management application 130 or may recognize activity as relating to a specific development project. Other activities and projects may also be identified. The user activity context identification and management application 130 may generate an activity context for the identified project/activity. The activity context may be named or otherwise labelled for reference. The activity context may include information about the project/activity, for example, specific resources consulted, types of resources consulted, location of resources, keywords used in resources, search terms used in locating resources, time spent on certain resources, time spent searching for resources, and the like.

In some embodiments, the user activity monitoring module 131 may generate the activity context based upon the monitoring, analysis, and/or parsing as described above. Alternatively, the user activity context identification and management application 130 may include an activity context generating module 133 as described above, in which case the activity context generating module 133 may generate the activity context including any naming or labelling. Still further, in some embodiments, the user 150 may generate the activity context directly and may name or label the activity context. The user 150 may also be provided the option of identifying headings, topics, key words, key terms, and other information that should be included in the monitoring, analysis, and/or parsing to determine the activity context.

It will be understood that a user 150 may have more than one activity context at any given time. The user activity monitoring module 131 may monitor, analyze, and/or parse user activity and resources consulted to determine if the activity and/or resource belongs to a specific activity context and/or whether a new activity context should be generated. Further, the user activity monitoring module 131 may assign resources to a specific activity context or to more than one activity context. The results of the monitoring, analysis, and/or parsing and/or the assignment of the resource to an activity context may be provided to the activity context graph generating module 132.

Embodiments of the activity context graph generating module 132 may include one or more components of hardware and/or software program code for generating an activity context graph based on information from the user activity monitoring module 131, for example, based on the monitoring, analyzing, and/or parsing conducted by the user activity monitoring module 131. The activity context graph may be any type of representation of the resources accessed by the user 150 that have been assigned to the activity context. For example, the activity context graph may be a visual representation of the resources accessed by the user 150. The activity context graph may show relationships between resources, frequency of key words or terms, heading information, time spent accessing the resource, and other information about the resource or the user's interaction with the resource. The activity context graph may include information regarding the order in which the user accessed resources, how many times the resources were accessed, if one resource cited, linked or referred to another resource, if the user quoted or cited the resource, and other information. Still further, the activity context graph may include meta data for the resources as well as date information, author or source information, information regarding reliability or trustworthiness, etc. The activity context graph may include information regarding what resources had been used or accessed by the user 150 at various points of time, thereby allowing the user 150 to request a "restored" activity context graph limited to specific time periods of the project.

Still further, the activity context graph may include information about specific portions of the resource the user 150 spent the most time accessing or using. For example, if the resource contains dynamic content such as audio or video, the user 150 may have watched/listened to specific portions multiple times. Similarly, the user 150 may have navigated back to a certain slide of a presentation to review the information therein.

Likewise, the user 150 may refer back to certain resources while accessing other resources. For example, the user 150 may access a technical paper and may refer back to another resource that treats the same topic at a higher overview level, or may refer to a resource containing definitions of commonly-used terms in the industry. The activity context graph may include information about the timing and nature of these references back to other resources and associate that information with the resources.

The activity context graph may contain links to the resources included in the activity context graph. For example, the activity context graph may include a hyperlink to the resources location on the internet, in a database, in a network-accessible knowledge base, in a server, etc. Still further, the activity context graph may itself be a file, document, or other item that includes a copy of the resource.

In some embodiments, the user activity context management system 100 and/or the user activity context identification and management application 130 may be capable of further monitoring, parsing and/or analyzing activity and resources within the activity context and/or within the activity context graph to identify or generate sub-activity contexts. Sub-activity contexts may be identified, generated, and/or tracked in the same manner discussed above with respect to activity contexts; however, sub-activity contexts may occur at a further level of granularity—i.e., a further detailed level within the scope of the activity context.

The activity context graph may also score or weight resources. For example, resources may be scored or weighted based on number of accesses, time spent accessing, additional resources accessed through citations or links in the resources, level of citation in the resource, and other features. The score or weight may be presented to the user 150 visually, for example by including a numerical or symbolic score next to the resource or by other visual means. For example, resources may be color coded by score or weight, or resources with higher scores/weights may be made proportionally larger in activity context graph.

The activity context graph may be saved to allow the user 150 to access the activity context graph at a later time. This may be desirable in situations in which the user 150 switches from project to project or activity to activity. Thus, the user 150 may work on a first project/activity for some time and the user activity context management system 100 may generate an activity context graph for all of the resources accessed during that time. If the user then switches to a second project/activity for a time period, the user 150 may later return to the first project/activity and easily resume work by consulting the activity context graph. The activity context graph may show the user 150 what resources had been accessed/consulted along with time spent on the resources, research trails within the resources, most used resources, and the like.

In some embodiments, the user activity context management system 100 may be configured to allow for sharing of the activity context graph with other individuals beside the user 150. For example, if a new individual takes over the project/activity or assist with a certain part of the project/activity, the activity context graph may provide an efficient means for relaying the work done and resources consulted by the user 150 to the new individual working on the project/activity. In some embodiments, the user activity context management system 100 may be able to manage the new individual's work/activity and either add it to the activity context graph or create a new activity context graph for the new individual. If the new individual's activity is added to the activity context graph the new individual's activity may be marked or labelled to distinguish it from the user 150's. If a new activity context graph is created for the new individual the two activity context graphs may be marked as related, linked in some way, may cross-reference each other, or may otherwise indicate relationship between the two.

In addition to sharing with co-workers or others involved in the project, the activity context graph may be shareable with other unrelated individuals. For example, the activity context graph may be sent to other individuals who will work on similar projects/activities. The other individuals may use the activity context graph for planning purposes, for example, to estimate the amount of resources available, the amount of time needed, specific resources to consult first, and the like.

In further embodiments, the user activity context management system 100 may include information about the user 150 and/or other users. For example, the user 150 may have a profile. The profile may include information about the user 150, including social media information, culture information, geo-location information, age information, sex/gender information, income information, employment information, and the like. The profile may also indicate usage areas for the user, for example, whether the user accesses resources for work, education or schooling, personal reasons, or other reasons. Other users may also have profiles including such information.

The user activity context management system 100 may be capable of updating, editing, or supplementing the user 150's activity context graph when shared with other individuals. For example, if the user 150's activity context graph is shared with other individuals have different geo-location information from the user 150, the user activity context management system 100 may update the user 150's activity context graph so that resources applicable to the other individual's respective geo-locations are included instead of the resources accessed by the user 150. Similar updating, editing, and/or supplementing may be performed on the basis of the other information included in the other individual's respective profile. For example, the user activity context management system 100 may recognize that younger users are likely to prefer dynamic content over static content and may replace static resources with similar dynamic content or vice versa depending on the age of the user. Still further, the user activity context management system 100 may recognize the intended usage area for the user and may edit the activity context graph to include resources appropriate for that usage area—for example, the user activity context management system 100 may recognize that an activity context graph was created by the user 150 for personal reasons, but other individuals are using the activity context graph for educational purposes and may edit the activity context graph to remove public or unofficial resources such as blogs or Wikipedia while retaining peer reviewed journal resources and articles from reputable news organizations.

Figure 2:
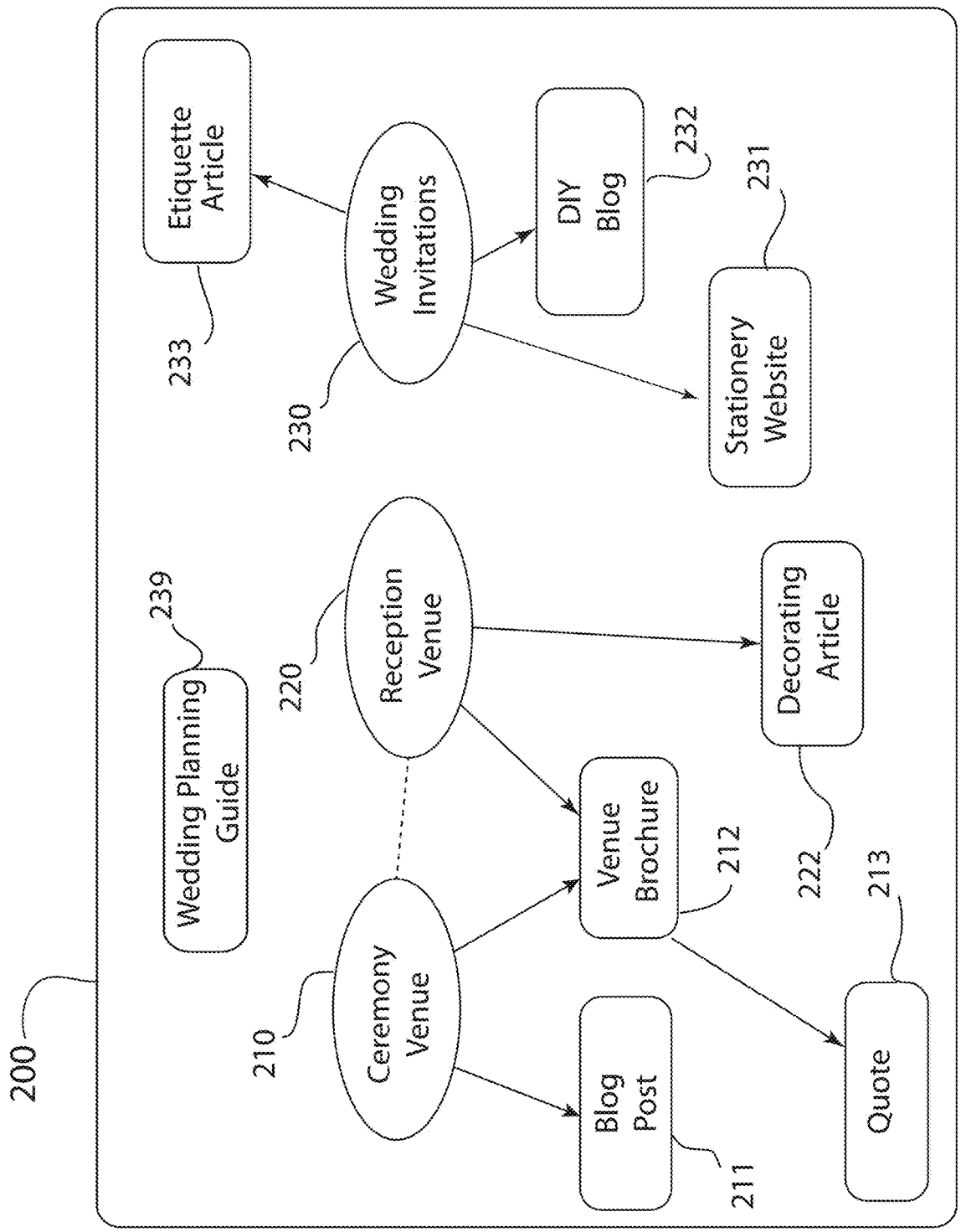
FIG. 2 depicts a block diagram of an activity context graph 200 in accordance in accordance with embodiments of the present invention.

FIG. 2 depicts a block diagram of an activity context graph 200 in accordance in accordance with embodiments of the present invention. The activity context graph 200 relates to a wedding planning project/activity undertaken by the user 150. It will be understood that the following description is given for illustration only, without limiting the scope of the invention, and embodiments of the present invention may be applicable to other projects/activities and activity contexts, not just to wedding planning.

The user 150 may begin planning a wedding by researching vendors such as wedding photographers, wedding videographers, wedding reception halls, wedding consultants and planners, wedding cake bakers, wedding florists, wedding limousine services, etc. Further, the user 150 may watch videos offering wedding tips, read articles about wedding planning, review brochures or quotes regarding wedding services, read or subscribe to blogs offering wedding tips, and the like.

The user 150 may initially access a wedding planning blog or an article about how to begin wedding planning on the electronic device 110. The user activity context management system 100 may recognize key words and terms such as "wedding", "planning", and the like by monitoring the user 150's activity on the electronic device 110. The user activity context management system 100 may create a new activity context for wedding planning and generate the activity context graph 200. Alternatively, the user 150 may create a new activity context for wedding planning at which point the user activity context management system 100 may create the activity context graph 200 and begin monitoring the user 150's activity for information related to the wedding planning.

The user activity context management system 100 may further identify sub-activities researched or planned by the user 150, for example, the user activity context management system 100 may identify subtopics of wedding planning such as the ceremony venue 210, reception venue 220, and wedding invitations 230.

As the user 150 accesses various resources on the electronic devices 110, the user activity context management system 100 may monitor, analyze, and/or parse the resources as has been described. The user activity context management system 100, for example, the user activity monitoring module 131 may associate the resource with an activity context and the user activity context management system 100 may include the resources in the activity context graph. For example, in the embodiment of FIG. 2, the user activity context management system 100 and/or the user activity monitoring module 131 may identify information in resources accessed by the user and associate the resources with the activity context graph 200 and/or with sub-activities or subtopics of the activity context graph 200 such as ceremony venue 210, reception venue 220, and wedding invitations 230. As shown in FIG. 2, the resources may then be included in the activity context graph 200. For example, resource 211 may be a blog post discussing tips for selecting a venue for a wedding ceremony. The user activity context management system 100 and/or the user activity monitoring module 131 may associate the blog post 211 accessed by the user 150 and include it in the activity context graph 200 and more specifically may associate the blog post 211 with the ceremony venue subtopic 210. Likewise, the user 150 may access a venue brochure 212, for example, a brochure advertising a venue's features and services. The venue brochure 212 may also be included in the activity context graph 200 and associated with the ceremony venue subtopic 210. Still further, the user activity context management system 100 and/or the user activity monitoring module 131 may determine that the venue brochure 212 is also related to the reception venue subtopic 220 because it includes information regarding reception hosting services. Thus, the venue brochure 212 may also be associated with the reception venue subtopic 220 in the activity context graph. Moreover, the user activity context management system 100 and/or the user activity monitoring module 131 may determine that similar resources are used for both the ceremony venue subtopic 210 and the reception venue topic 220 and may show those subtopics as being related or as including the same or similar resources. Likewise, the user activity context management system 100 and/or the user activity monitoring module 131 may determine that resources such as a stationery website 231, a do-it-yourself (DIY) blog 232, and an etiquette article 233 relate to the wedding invitations subtopic 230 and may include those resources in the activity context graph 200 and associate them with the wedding invitations subtopic 230.

Some resources may lead to other resources, and the activity context graph 200 may show that relationship. For example, after reviewing the venue brochure 212, the user may be able to access a quote 213 showing pricing options and other information. The activity context graph 200 may show the quote 213 as being related to or being "downstream" of the venue brochure 212.

Some resources may be included in the activity context graph 200 but may not be assigned to or associated with a subtopic, for example, a resource such as a wedding planning guide 239 may not be associated with a specific subtopic and may be included alone in the activity context graph 200. Alternatively, the wedding planning guide 239 may be shown as associated with or connected to all of the subtopics 210, 220, and 230 and/or all of the resources. Still further, the activity context graph 200 may not use subtopics and may show only the resources themselves and relationships between them.

As discussed above, the activity context graph 200 may contain links to the resources accessed by the user 150. For example, the activity context graph 200 may have a bookmark or hyperlink to the blog post 211, the venue brochure 212, and/or other resources. The activity context graph may alternatively save a copy of the blog post 211, the venue brochure 212, and/or other resources. Further, the quote 213 may be generated for the user 150 as a PDF or other file type and a copy of the file may be saved by the user activity context management system 100.

As discussed above, the activity context graph 200 may be shared with other users and may be updated according to the other user's preferences or settings. For example, a second user may have different cultural norms, may be located in a different geographical location, or may have a different budget than the user 150 for whom the activity context graph 200 was created. Thus, when the second user accesses the activity context graph 200, the activity context graph 200 may be updated. One example of an update may be to replace the etiquette article 233 with a different article that more closely aligns with the second user's cultural norms. Likewise, the activity context graph 200 may be updated to reflect the second user's geographical location—for example, the venue brochure 212 may be replaced by a brochure for a venue located in the second user's geographical location. Similarly, the quote 213 may include services that are not within the second user's budget, and the quote 213 may be updated or replaced with a quote for different services.

Figure 3:
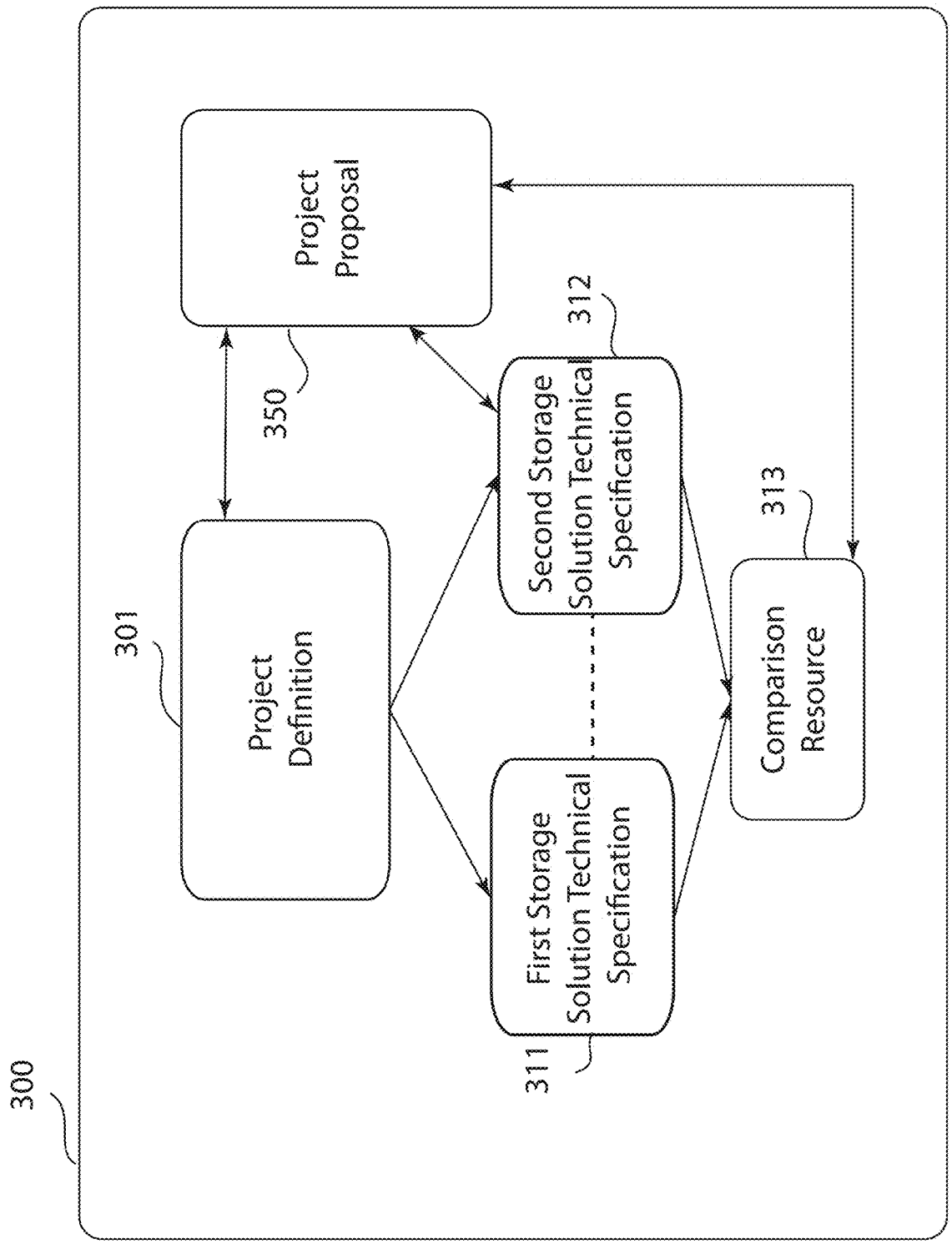
FIG. 3 depicts a block diagram of an activity context graph 300 in accordance in accordance with embodiments of the present invention.

FIG. 3 depicts a block diagram of an activity context graph 300 in accordance with embodiments of the present invention. The activity context graph 300 relates to the user 150's work on a virtual desktop infrastructure project for a customer. The user 150 may be provided with a project definition 301 specifying the customer's needs. The user activity context management system 100 and/or the user 150 may create a new project/activity for the virtual desktop infrastructure project for the customer, may create the activity context graph 300, and may identify the project definition 301 as a first resource to be included in the activity context graph 300.

The user activity context management system 100, for example, the user activity monitoring module 131 may thereafter monitor, analyze, and/or parse the user's activity and resources accessed to determine if they are related to the virtual desktop infrastructure project and may update the activity context graph 300 accordingly. For example, the project definition 301 may call for a storage solution. The user 150 may begin to research storage solutions, for example storage solutions the user 150 provides or storage solutions from different suppliers or vendors. For example, the user 150 may research a first storage solution and a second storage solution and may consult resources such as a first storage solution technical specification 311 and a second storage solution technical specification 312. The user activity context management system 100, for example, the user activity monitoring module 131 may recognize the first storage technical specification 311 and the second storage solution technical specification 312 are both related to storage and may represent a relationship between them by a dashed line. Further, the user 150 may consult a comparison resource 313 that compares the first storage solution with the second storage solution and provides pros and cons for each respective storage solution. The comparison resource 313 may be shown as related to both the first storage technical specification 311 and the second storage solution technical specification 312.

Similar research may be performed for other requirements listed in the project definition 301, and resources accessed may be monitored and added to the activity context graph 300 as appropriate.

Upon choosing a storage solution, the user 150 may create a project proposal 350. The project proposal 350 may include information about the virtual desktop infrastructure project including the storage solution. For example, the user 150 may select the second storage solution as the better solution for the virtual desktop infrastructure project. The details of the second storage solution may be included in the project proposal 350. The project proposal 350 may link to the second storage solution technical specification 312 and/or to the comparison resource 313, and vice versa. In some embodiments, the project proposal 350 may also link to the first storage solution technical specification 311 as a resource that was considered to generate the project proposal 350. The project definition 301 may also be connected to the project proposal 350 and vice versa.

The user 150 may be required to turn the virtual desktop infrastructure project over to a colleague before completion or may need a colleague to assist in the virtual desktop infrastructure project. The activity graph 300 will allow the colleague to quickly and efficiently determine the research that was performed, including the comparison of the storage solutions, and understand why the project proposal includes the second storage solution. Further, the colleague may quickly and efficiently access the underlying resources, namely the first storage solution technical specification 311, the second storage solution technical specification 312, and the comparison resource 313.

As previously discussed, the activity context graph 300 may include links to the resources accessed during the project, namely the first storage solution technical specification 311, the second storage solution technical specification 312, and the comparison resource 313 or may otherwise include copies or direct an individual reviewing the activity context graph 300 to the resources.

Still further, the activity context graph 300 may be shareable with other individuals and may be capable of being updated or edited. For example, user settings or profile information may be used to update the activity context graph 300 in the manner already described with respect to other embodiments.

Referring again to FIG. 1, various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention).

Embodiments of the user activity context management system 100 improves the speed, reliability, and efficiency of tracking and monitoring user activity on a project, particularly when various resources are accessed, consulted, or generated during the activity/project. Embodiments of the user activity context management system 100 also improve efficiency in which new individuals may be brought into projects, projects may be transferred to new individuals, or an original user may refresh their recollection of the state of the project. The user activity context management system 100 provides a technical solution by intelligently monitoring, analyzing, and parsing user activity on electronic devices, tracking the user activity, associating the activity and accessed resources with a specific activity context, and generating an activity context graph. Embodiments of the present invention further overcome technical limitations present in every computing system. The technical solution(s) described herein is necessarily rooted in computer technology in order to overcome a problem specifically arising in the realm of user activity, particularly monitoring, representing, and potentially recreating time-consuming research and work performed. For instance, instead of a user needing to manually track resources used and information about the resource and the user's interaction with the resource, embodiments of the present invention automatically track and store this information. Likewise, instead of a user needing to explain the research and work performed to a colleague, the activity context graph provides a streamlined, interactive visual means of doing so. Further, instead of a new user needing to duplicate research and work performed on similar projects, the activity context graph may be updated or edited to fit the new user's unique settings, profile, or other information.

Figure 4:
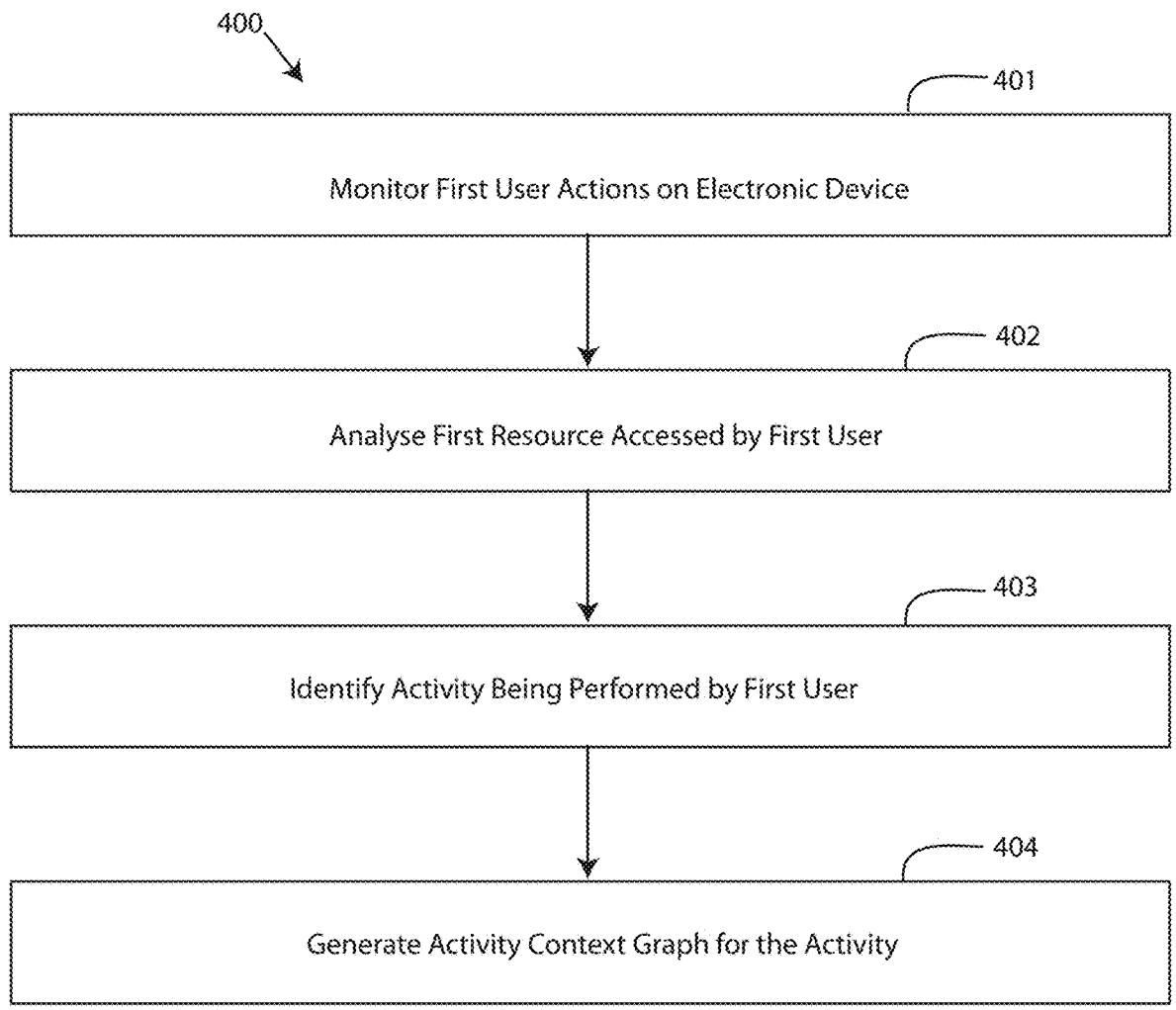
FIG. 4 depicts a flow chart of a method for managing user activity context, in accordance with embodiments of the present invention.

FIG. 4 depicts a flow chart of a method for managing user activity context, in accordance with embodiments of the present invention. One embodiment of a method 400 or algorithm that may be implemented for managing user activity context in accordance with the user activity context management system 100 is described in FIG. 1 using one or more computer systems as defined generically in FIG. 7 below, and more specifically by the specific embodiments of FIGS. 1-3.

Embodiments of the method 400 for managing user activity context may begin at step 401 wherein a first user's actions on an electronic device are monitored. Step 402 analyzes a first resource accessed by the first user. This may be accomplished by monitoring, analyzing, and/or parsing content of the resource. Step 403 identifies an activity being performed by the first user. The identification may be accomplished based on the monitoring, analyzing, and/or parsing of the first resource. Step 404 generates an activity context graph for the identified activity. The activity context graph may include information regarding the first resource.

Figure 5:
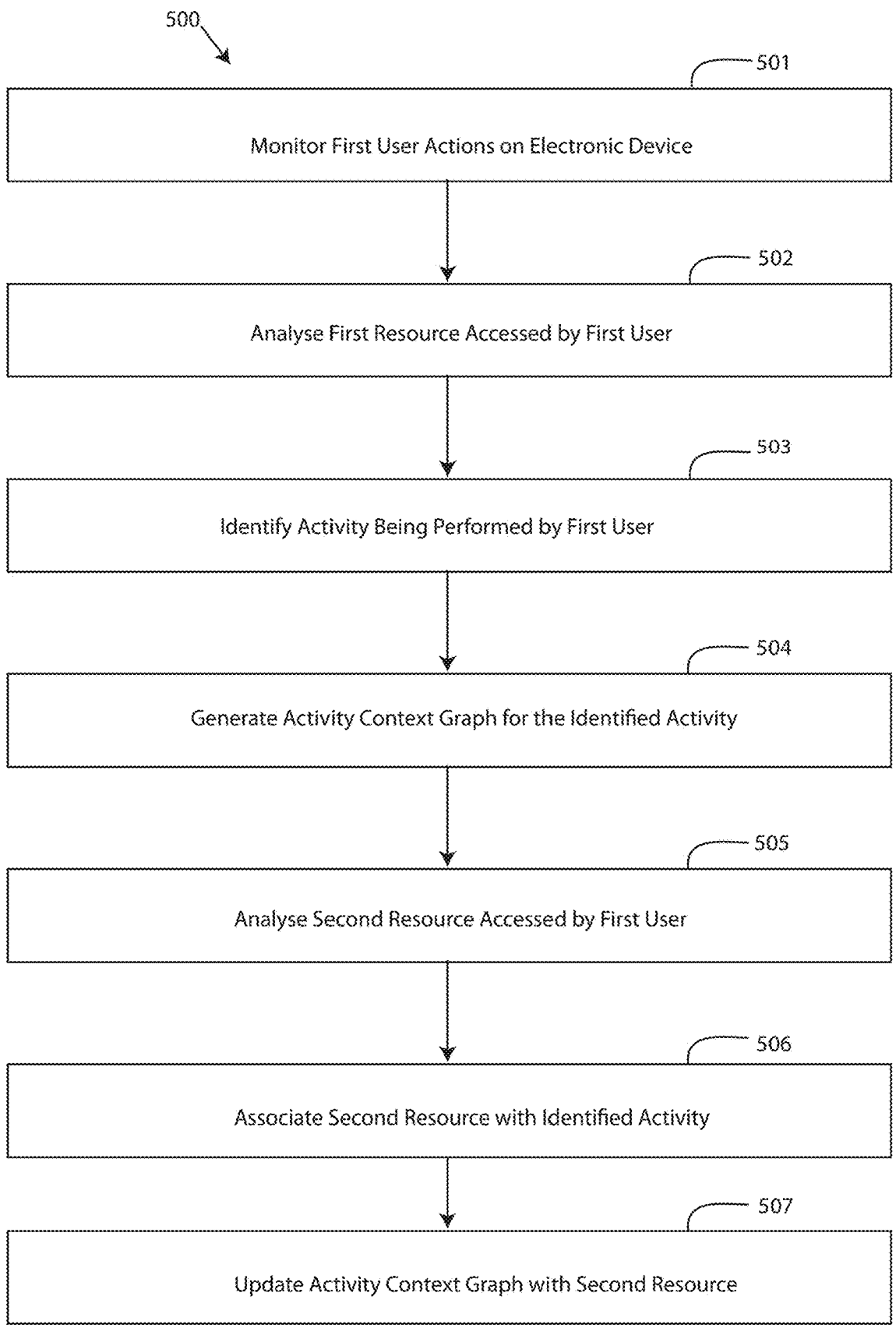
FIG. 5 depicts a flow chart of a method for managing user activity context, in accordance with additional embodiments of the present invention.

FIG. 5 depicts a flow chart of a method for managing user activity context, in accordance with embodiments of the present invention. One embodiment of a method 500 or algorithm that may be implemented for managing user activity context in accordance with the user activity context management system 100 is described in FIG. 1 using one or more computer systems as defined generically in FIG. 7 below, and more specifically by the specific embodiments of FIGS. 1-3.

Steps 501-504 may correspond to steps 401-404, respectively. In step 505, a second resource accessed by the first user is analyzed. In step 506, the second resource is associated with the identified activity. In step 507, the activity context graph is updated with information regarding the second resource.

Figure 6:
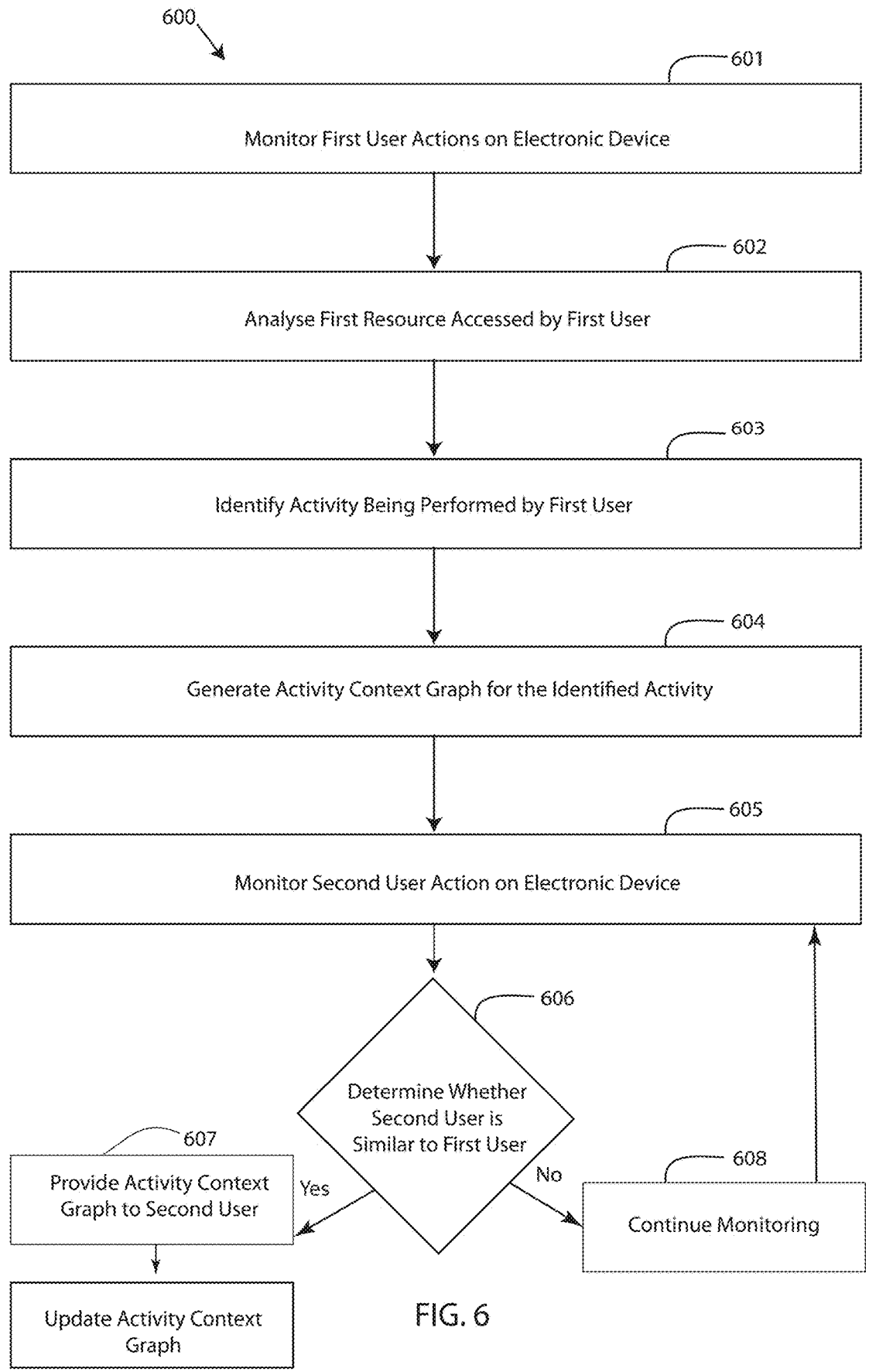
FIG. 6 depicts a flow chart of a method for managing user activity context, in accordance with further embodiments of the present invention.

FIG. 6 depicts a flow chart of a method for managing user activity context, in accordance with embodiments of the present invention. One embodiment of a method 600 or algorithm that may be implemented for managing user activity context in accordance with the user activity context management system 100 is described in FIG. 1 using one or more computer systems as defined generically in FIG. 7 below, and more specifically by the specific embodiments of FIGS. 1-3.

Steps 601-604 may correspond to steps 401-404 and 501-504, respectively. In step 605, a second user's actions on an electronic device are monitored. In step 606, it is determined whether the second user is similar to the first user. Similar may mean that the second user is engaged in the same project/activity as the first user, or is engaged in a similar project/activity. If the second user is determined to be similar, the activity context graph may be provided to the second user as shown in step 607. If the second user is determined not to be similar, the second user's action may continue to be monitored as shown in 608 but the activity context graph may not be provided.

In some embodiments, after the activity context graph is provided to the second user as shown in step 607, the method may further comprise updating the activity context graph in step 609. For example, the activity context graph may be updated to reflect the second user's profile, settings, or other information.

Figure 7:
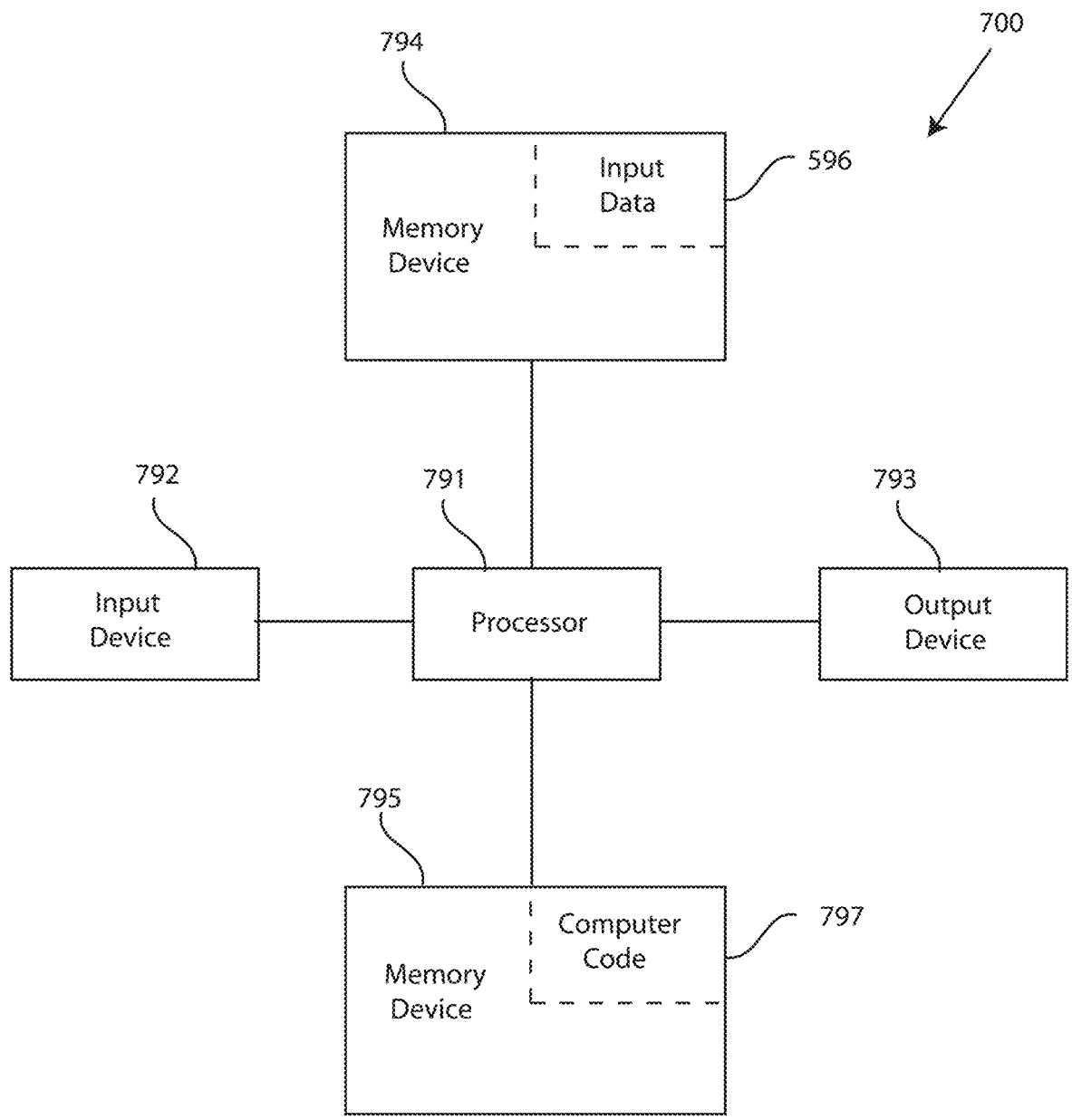
FIG. 7 depicts a block diagram of a computer system for the user activity context management system of FIGS. 1-3, capable of implementing the methods for managing an electric vehicle electricity contract of FIGS. 4-6, in accordance with embodiments of the present invention.

FIG. 7 depicts a block diagram of a computer system for the user activity context management system of FIGS. 1-3, capable of implementing the methods for managing an electric vehicle electricity contract of FIGS. 4-6, in accordance with embodiments of the present invention.

The computer system 700 may generally comprise a processor 791, an input device 792 coupled to the processor 791, an output device 793 coupled to the processor 791, and memory devices 794 and 795 each coupled to the processor 791. The input device 792, output device 793 and memory devices 794, 795 may each be coupled to the processor 791 via a bus. Processor 791 may perform computations and control the functions of computer system 700, including executing instructions included in the computer code 797 for the tools and programs capable of implementing methods for managing user activity context in the manner prescribed by the embodiments of FIGS. 4-6 using the user activity context management system 100 of FIGS. 1-3, wherein the instructions of the computer code 797 may be executed by processor 791 via memory device 795. The computer code 797 may include software or program instructions that may implement one or more algorithms for implementing the methods for managing user activity context, as described in detail above. The processor 791 executes the computer code 797. Processor 791 may include a single processing unit, or may be distributed across one or more processing units in one or more locations (e.g., on a client and server).

The memory device 794 may include input data 796. The input data 796 includes any inputs required by the computer code 797. The output device 793 displays output from the computer code 797. Either or both memory devices 794 and 795 may be used as a computer usable storage medium (or program storage device) having a computer-readable program embodied therein and/or having other data stored therein, wherein the computer-readable program comprises the computer code 797. Generally, a computer program product (or, alternatively, an article of manufacture) of the computer system 700 may comprise said computer usable storage medium (or said program storage device).

Memory devices 794, 795 include any known computer-readable storage medium, including those described in detail below. In one embodiment, cache memory elements of memory devices 794, 795 may provide temporary storage of at least some program code (e.g., computer code 797) in order to reduce the number of times code must be retrieved from bulk storage while instructions of the computer code 797 are applied. Moreover, similar to processor 791, memory devices 794, 795 may reside at a single physical location, including one or more types of data storage, or be distributed across a plurality of physical systems in various forms. Further, memory devices 794, 795 can include data distributed across, for example, a local area network (LAN) or a wide area network (WAN). Further, memory devices

794, 795 may include an operating system (not shown) and may include other systems not shown in FIG. 7.

In some embodiments, the computer system 700 may further be coupled to an input/output (I/O) interface and a computer data storage unit. An I/O interface may include any system for exchanging information to or from an input device 792 or output device 793. The input device 792 may be, inter alia, a keyboard, a mouse, etc. or in some embodiments the touchscreen of a computing device. The output device 793 may be, inter alia, a printer, a plotter, a display device (such as a computer screen), a magnetic tape, a removable hard disk, a floppy disk, etc. The memory devices 794 and 795 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 700, and may include any type of transmission link, including electrical, optical, wireless, etc.

An I/O interface may allow computer system 700 to store information (e.g., data or program instructions such as program code 797) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to user activity context management systems and methods. Thus, an embodiment of the present invention discloses a process for supporting computer infrastructure, where the process includes providing at least one support service for at least one of integrating, hosting, maintaining and deploying computer-readable code (e.g., program code 797) in a computer system (e.g., computer system 700) including one or more processor(s) 791, wherein the processor(s) carry out instructions contained in the computer code 797 causing the computer system to manage user activity context. Another embodiment discloses a process for supporting computer infrastructure, where the process includes integrating computer-readable program code into a computer system 700 including a processor.

The step of integrating includes storing the program code in a computer-readable storage device of the computer system 700 through use of the processor. The program code, upon being executed by the processor, implements a method for managing user activity context. Thus, the present invention discloses a process for supporting, deploying and/or integrating computer infrastructure, integrating, hosting, maintaining, and deploying computer-readable code into the computer system 700, wherein the code in combination with the computer system 700 is capable of performing a method for managing user activity context.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
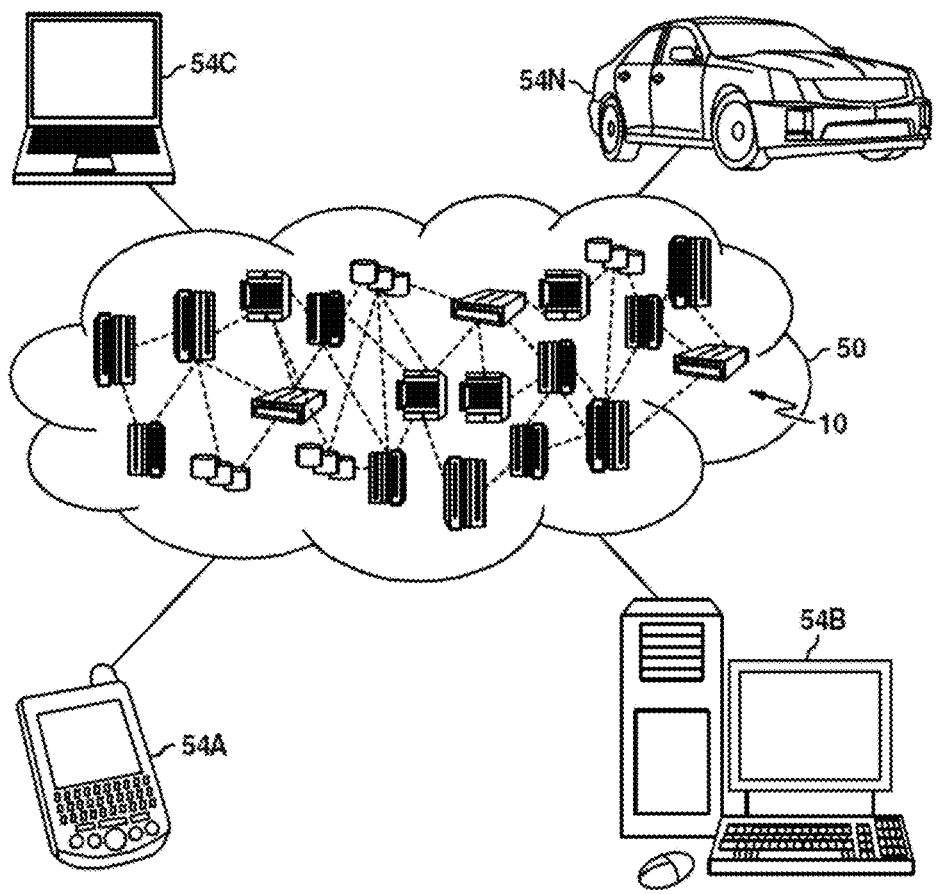
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
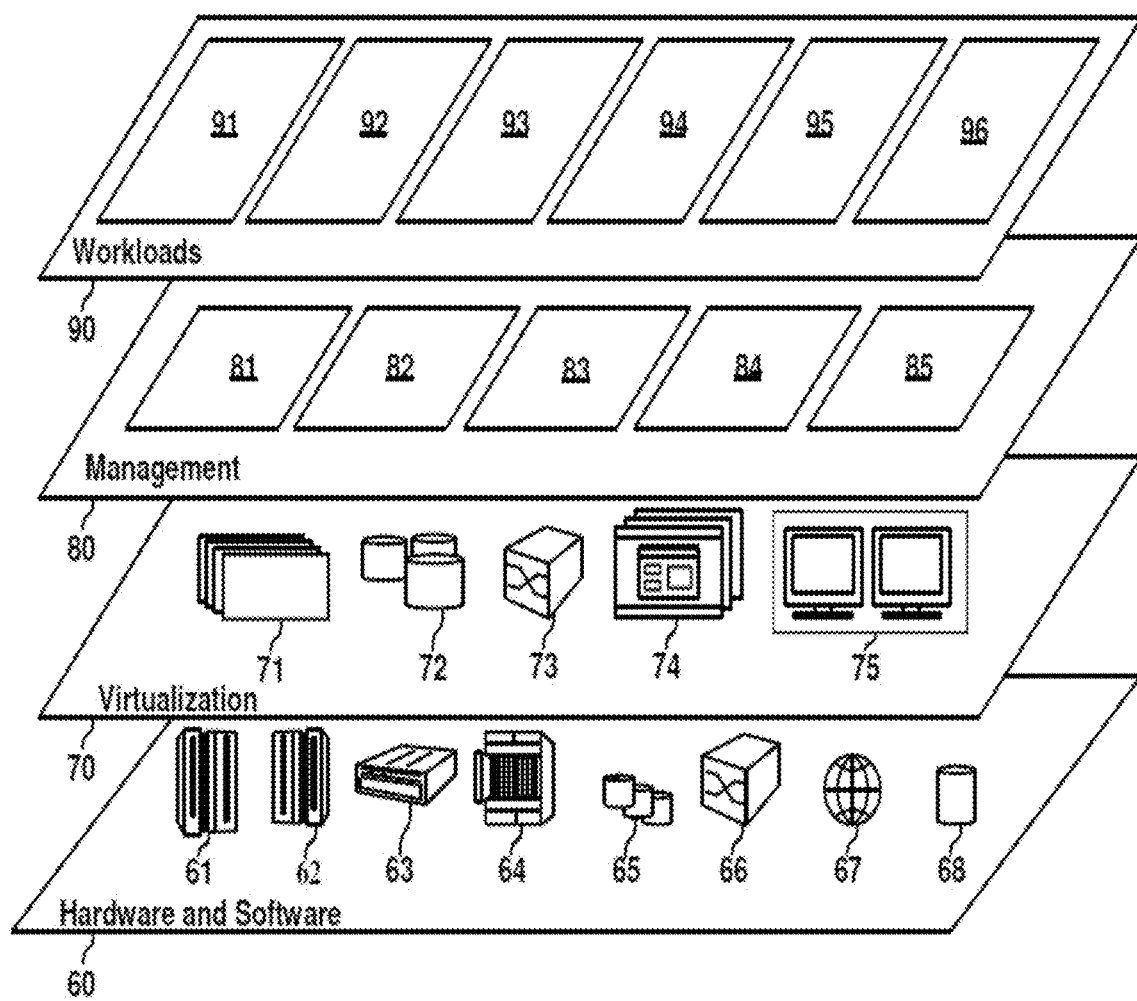
FIG. 9 depicts abstraction model layers, in accordance with embodiments of the present invention.

Referring now to FIG. 9, a set of functional abstraction layers provided by cloud computing environment 50 (see FIG. 8) are shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user activity context management 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   monitoring, by a processor of a computing system, a first user's actions on an electronic device;
   analyzing, by the processor, a first resource accessed by first user, the analyzing being performed simultaneous to the first user's access of the first resource;
   identifying, by the processor, an activity being performed by the first user based on the analyzing of the first resource; and
   generating, by the processor, an activity context graph for the identified activity, wherein the activity context graph includes a link to the first resource automatically stored in response to the user accessing the first resource information.

2. The method of claim 1; further comprising:

analyzing, by the processor, a second resource accessed by the first user;

associating, by the processor, the second resource with the identified activity;

updating, by the processor, the activity context graph for the activity, wherein the activity context graph is updated with information regarding the second resource.

3. The method of claim 2, wherein the activity context graph is updated to include information regarding a relationship between the first resource and the second resource.

4. The method of claim 2, wherein the first resource is accessed on a first electronic device and the second resource is accessed on a second electronic device.

5. The method of claim 1, wherein the information regarding the first resource includes the first resource itself.

6. The method of claim 1, further comprising:

monitoring, by the processor, a second user's actions on an electronic device;

determining, by the processor, whether the second user is similar to the first user; and providing, by the processor, the activity context graph to the second user if the processor determines the second user is similar to the first user.

7. The method of claim 6, wherein the activity context graph is updated to reflect settings or preferences of the second user.

8. The method of claim 6, wherein determining whether the second user is similar to the first user comprises identifying the second user is engaged in the same or substantially similar activity as the identified activity.

9. A computing system, comprising:

a processor;

a memory device coupled to the processor; and a computer readable storage device coupled to the processor, wherein the storage device contains program code executable by the processor via the memory device to implement a method for managing user activity, the method comprising:

monitoring, by a processor of a computing system, a first user's actions on an electronic device;

analyzing, by the processor, a first resource accessed by the first user, the analyzing being performed simultaneous to the first user's access of the first resource;

identifying, by the processor, an activity being performed by the first user based on the analyzing of the first resource; and generating, by the processor, an activity context graph for the identified activity, wherein the activity context graph includes a link to the first resource automatically stored in response to the user accessing the first resource.

10. The computing system of claim 9; wherein the method further comprises:

analyzing, by the processor, a second resource accessed by the first user;

associating, by the processor, the second resource with the identified activity;

updating, by the processor, the activity context graph for the activity; wherein the activity context graph is updated with information regarding the second resource.

11. The computing system of claim 10, wherein the activity graph is updated to include information regarding a relationship between the first resource and the second resource.

12. The computing system of claim 10, wherein the first resource is accessed on a first electronic device and the second resource is accessed on a second electronic device.

13. The computing system of claim 9, wherein the information regarding the first resource includes the first resource itself.

14. The computing system of claim 9, further comprising:

monitoring, by the processor, a second user's actions on an electronic device;

determining, by the processor, whether the second user is similar to the first user; and providing, by the processor, the activity context graph to the second user if the processor determines the second user is similar to the first user.

15. The computing system of claim 14, wherein the activity context graph is updated to reflect settings or preferences of the second user.

16. The computing system of claim 14, wherein determining whether the second user is similar to the first user comprises identifying the second user is engaged in the same or substantially similar activity as the identified activity.

17. A computer program product, comprising a computer readable hardware storage device storing a computer readable program code, the computer readable program code comprising an algorithm that when executed by a computer processor of a computing system implements a method for managing user activity, the method comprising:

monitoring, by a processor of a computing system, a first user's actions on an electronic device;

analyzing, by the processor, a first resource accessed by the first user, the analyzing being performed simultaneous to the first user's access of the first resource;

identifying, by the processor, an activity being performed by the first user based on the analyzing of the first resource; and generating, by the processor, an activity context graph for the identified activity, wherein the activity context graph includes a link to the first resource automatically stored in response to the user accessing the first resource.

18. The computer program product of claim 17, wherein the method further comprises:

analyzing, by the processor, a second resource accessed by the first user;

associating, by the processor, the second resource with the identified activity;

updating, by the processor, the activity context graph for the activity, wherein the activity context graph is updated with information regarding the second resource.

19. The computer program product of claim 17, wherein the method further comprises:

monitoring, by the processor, a second user's actions on an electronic device;

determining, by the processor, whether the second user is similar to the first user; and providing, by the processor, the activity context graph to the second user if the processor determines the second user is similar to the first user.

20. The computer system product of claim 19, wherein the activity context graph is updated to reflect settings or preferences of the second user.

* * * * *